United States Patent [19]
Riddle et al.

[11] Patent Number: 5,399,828
[45] Date of Patent: * Mar. 21, 1995

[54] LASER TABLET TREATMENT SYSTEM WITH DUAL ACCESS TO TABLET

[75] Inventors: Thomas A. Riddle, San Francisco; Johan H. Geerke, Los Altos; Keith P. Minton, San Jose, all of Calif.

[73] Assignee: Alza Corporation, Palo Alto, Calif.

[*] Notice: The portion of the term of this patent subsequent to Mar. 15, 2011 has been disclaimed.

[21] Appl. No.: 153,249

[22] Filed: Nov. 16, 1993

Related U.S. Application Data

[63] Continuation of Ser. No. 820,704, Jan. 14, 1992.

[51] Int. Cl.$^6$ ............................................. B23K 26/00
[52] U.S. Cl. ............................ 219/121.7; 219/121.77; 219/121.82
[58] Field of Search ............ 219/121.7, 121.71, 121.82, 219/121.77, 121.78, 121.76, 121.81, 121.79

[56] References Cited

U.S. PATENT DOCUMENTS

| | | | |
|---|---|---|---|
| 3,524,046 | 8/1970 | Brouwer | 219/121.7 X |
| 3,764,775 | 10/1973 | Hasslinger et al. | 219/121 L |
| 4,063,064 | 12/1977 | Saunders et al. | 219/121 L |
| 4,088,864 | 5/1978 | Theeuwes et al. | 219/121 LM |
| 4,324,973 | 4/1982 | Kirwan et al. | 219/121 EA |
| 4,572,189 | 2/1986 | Smith et al. | 128/395 |
| 4,580,557 | 4/1986 | Hertzmann | 128/303.1 |
| 4,587,396 | 5/1986 | Rubin | 219/121 LU |
| 4,604,513 | 8/1986 | Lim | 219/121 LA |
| 4,608,480 | 8/1986 | Bizot et al. | 219/121 LK |
| 4,618,759 | 10/1986 | Miller et al. | 219/121 LR |
| 4,626,649 | 12/1986 | Dupeyrat et al. | 219/121 LU |
| 4,626,999 | 12/1986 | Bannister | 364/474 |
| 4,638,145 | 1/1987 | Sakuma et al. | 219/121 LU |
| 4,707,596 | 11/1987 | Hohberg | 250/201 |
| 4,710,604 | 12/1987 | Shirasu et al. | 219/121 LU |
| 4,720,618 | 1/1988 | Stamer et al. | 219/121 LA |
| 4,734,558 | 3/1988 | Nakano et al. | 219/121 LP |
| 4,806,728 | 2/1989 | Salzer et al. | 219/121.63 |
| 4,820,899 | 4/1989 | Hikima et al. | 219/121.76 |
| 4,843,209 | 6/1989 | Milligan | 219/121.63 |
| 4,906,813 | 3/1990 | Gajdos | 219/121.68 |
| 4,910,377 | 3/1990 | Matsutani et al. | 219/121.19 |
| 4,952,770 | 8/1990 | Hayashi | 219/121.67 |
| 5,006,108 | 4/1991 | LaPrade | 604/20 |
| 5,021,053 | 6/1991 | Barclay et al. | 604/892.1 |
| 5,057,072 | 10/1991 | Phipps | 604/20 |
| 5,117,087 | 5/1992 | Baker et al. | 219/121.71 |

*Primary Examiner*—Geoffrey S. Evans
*Attorney, Agent, or Firm*—D. Byron Miller; Steven F. Stone; Edward L. Mandell

[57] ABSTRACT

Tablet treating system 10 treats a series of pharmaceutical tablets 50T with pulses of laser energy 24P within at least one predetermined treatment site 50S on each tablet. A tablet conveyer 12 continuously moves individual tablets along a tablet path 10P. A Laser 14 provides the pulses of laser energy along a stationary laser path which crosses the tablet path defining a stationary intersection zone 14Z common to both paths. The tablet path has periodic treatment windows 20W during which the treatment sites 50S on the moving tablets pass through the stationary intersection zone. The operation of the laser has periodic laser ready windows 24W during which the laser may be fired. A controller 16 is responsive to the movement of the tablet conveyer and to the operation of the laser for activating the laser and treating the tablets. The controller activates the laser when a tablet is passing through the intersection zone and the tablet treatment window coincides with the laser ready window. The controller does not activate the laser and rejects the tablet when the tablet treatment window does not coincide with the laser ready window. An abort mechanism 18 proximate the collection end 10C of the tablet path is responsive to the controller for separating the treated tablets from the rejected tablets.

50 Claims, 4 Drawing Sheets

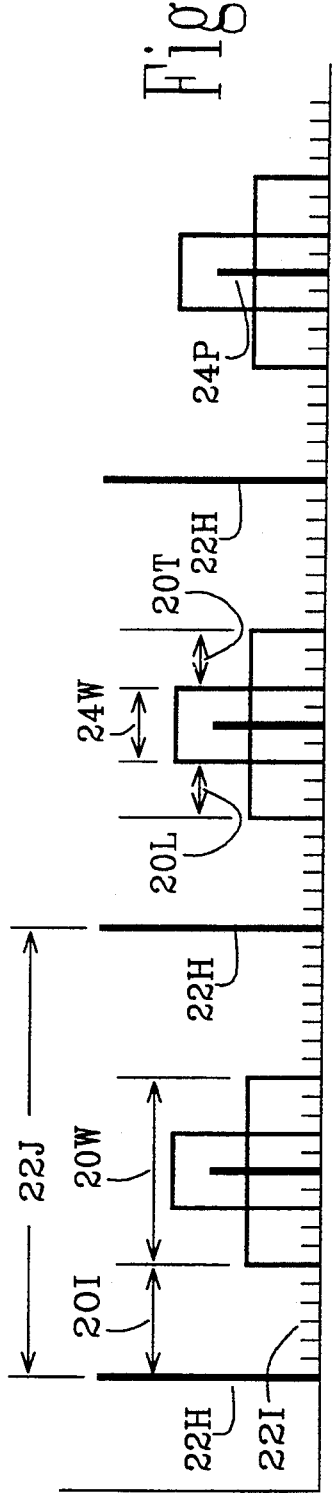
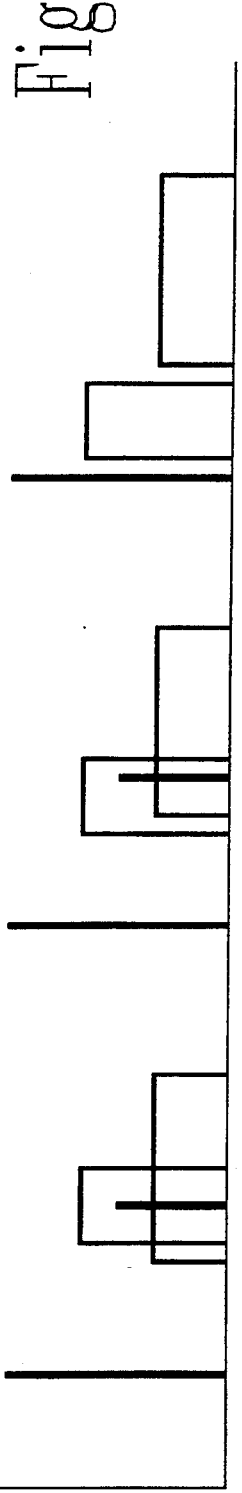
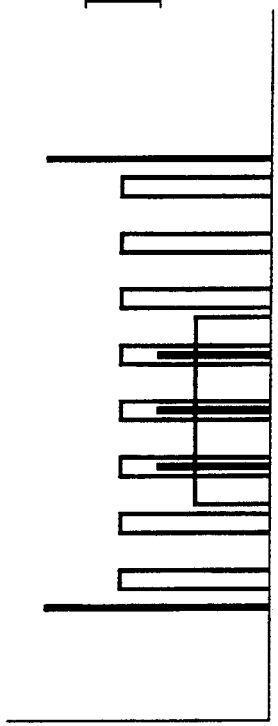

LASER TABLET TREATMENT SYSTEM WITH DUAL ACCESS TO TABLET

This is a continuation of application Ser. No. 07/820,704, filed Jan. 14, 1992.

TECHNICAL FIELD

This invention relates to laser drilling for forming drug release ports in pharmaceutical tablets, and more particularly to such drilling in which the tablet may be accessed from either side.

BACKGROUND ART

U.S. Pat. No. 4,063,064 issued on Dec. 13, 1977 to Richard J. Saunders and Wayne S. Mefferd, and U.S. Pat. No. 4,088,864 issued on May 9, 1978 to Felix Theeuwes, Richard J. Saunders and Wayne S. Mefferd, disclose a tablet treating machine with a single rotating wheel for transporting tablets up from a tablet reservoir to a laser treatment station.

The wheel is inclined and has a set of slots each of which carries a single tablet. The slots have a bottom surface, two side walls, and a back wall formed on the inclined side of the wheel for cradling the tablet during transport. The laser beam accesses the tablet on the front exposed side for drilling a drug release port therein. The tablets may be drilled on one side only. The backside of each tablet rests against the back wall of the slot and is inaccessible to the laser beam.

The energy of the laser pulse in these machines requires about five milliseconds to form the release port in the tablet. A tracking mirror is employed to keep the laser beam trained on the tablet during the laser pulse period. Synchronism between the laser pulse and the sequence of tablets is maintained manually by an operator who monitors the operation of the machine. The shape and size of the laser beam is controlled by laser optics.

DISCLOSURE OF THE INVENTION

The present invention provides an improved tablet treating system for treating pharmaceutical tablets with a laser beam.

This invention further provides such a tablet treating system which treats both sides of the tablets.

This invention further provides such a tablet treating system in which the laser beam is stationary and does not track the moving tablet.

This invention further provides such a tablet treating system in which the synchronization between the laser operation and the tablet motion is maintained automatically.

This invention further provides such a tablet treating system in which the laser operation is adjusted to maintain the laser-tablet synchronization.

This invention further provides such a tablet treating system in which tablets are aborted unless synchronization is maintained.

Briefly, the present invention provides a tablet treating system for treating pharmaceutical tablets with pulses of laser energy within at least one predetermined treatment site on each tablet. A conveyer continuously moves a series of individual tablets along a tablet path having a supply end for receiving untreated tablets and having a collection end. A laser provides the pulses of laser energy along a stationary laser path which crosses the tablet path defining a stationary intersection zone common to both paths. The tablet path has periodic treatment windows during which the treatment sites on the moving tablets pass through the stationary intersection zone. The operation of the laser has periodic laser ready windows during which the laser may be fired. A controller responsive to the movement of the tablet conveyer and to the operation of the laser activates the laser and treats a tablet when the tablet is passing through the intersection zone and the tablet treatment window coincides with the laser ready window. The controller does not activate the laser and rejects the tablet when the tablet treatment window does not coincide with the laser ready window. An abort device positioned proximate the collection end of the tablet path is responsive to the controller for separating the treated tablets from the rejected tablets.

BRIEF DESCRIPTION OF THE DRAWINGS

Further objects and advantages of the present system and the operation of synchronization and abort mechanism will become apparent from the following detailed description and drawing (not drawn to scale) in which:

FIG. 2A is timing diagram showing the tablet window and laser window during normal synchronized operation of the system;

FIG. 2B is timing diagram showing the windows during abnormal non-synchronized operation;

FIG. 2C is timing diagram for a three release port embodiment with three laser pulses;

Figure 1A:
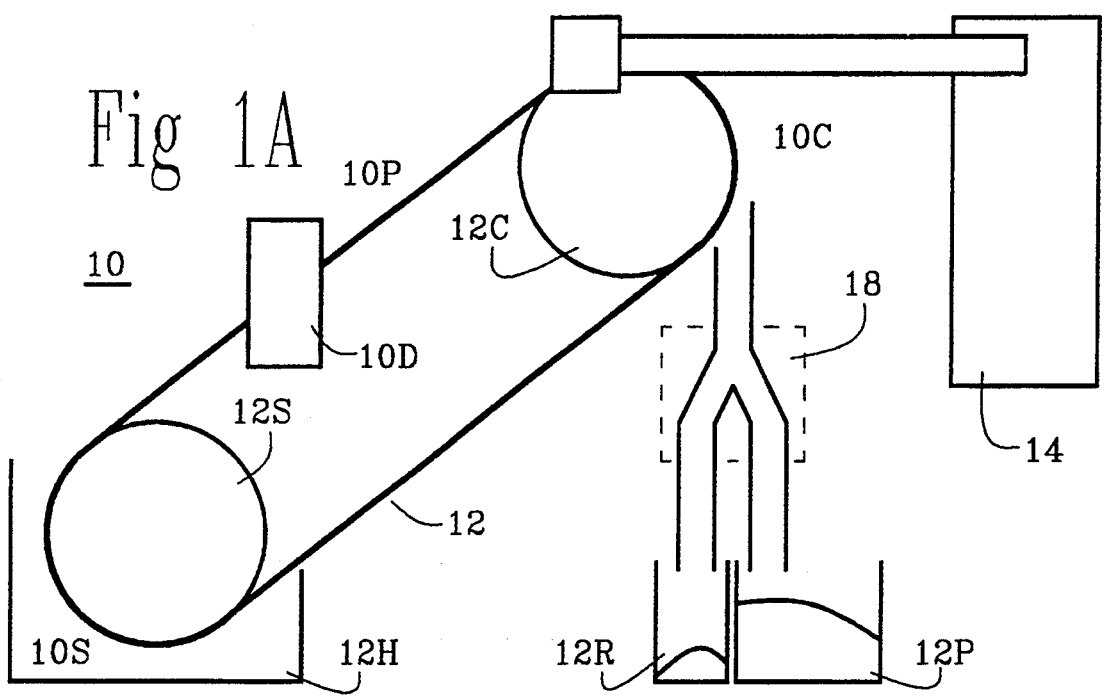
FIG. 1A is a side view of a tablet treatment system showing the basic elements of the system.

The elements of the invention are designated by two digit reference numerals in the above Figures. The first digit, indicates the Figure in which that element is first disclosed or is primarily described, The second digit indicates related features and structures throughout the Figures, Some reference numerals are followed by a letter which indicates a sub-portion or feature or that element.

Figure 1B:
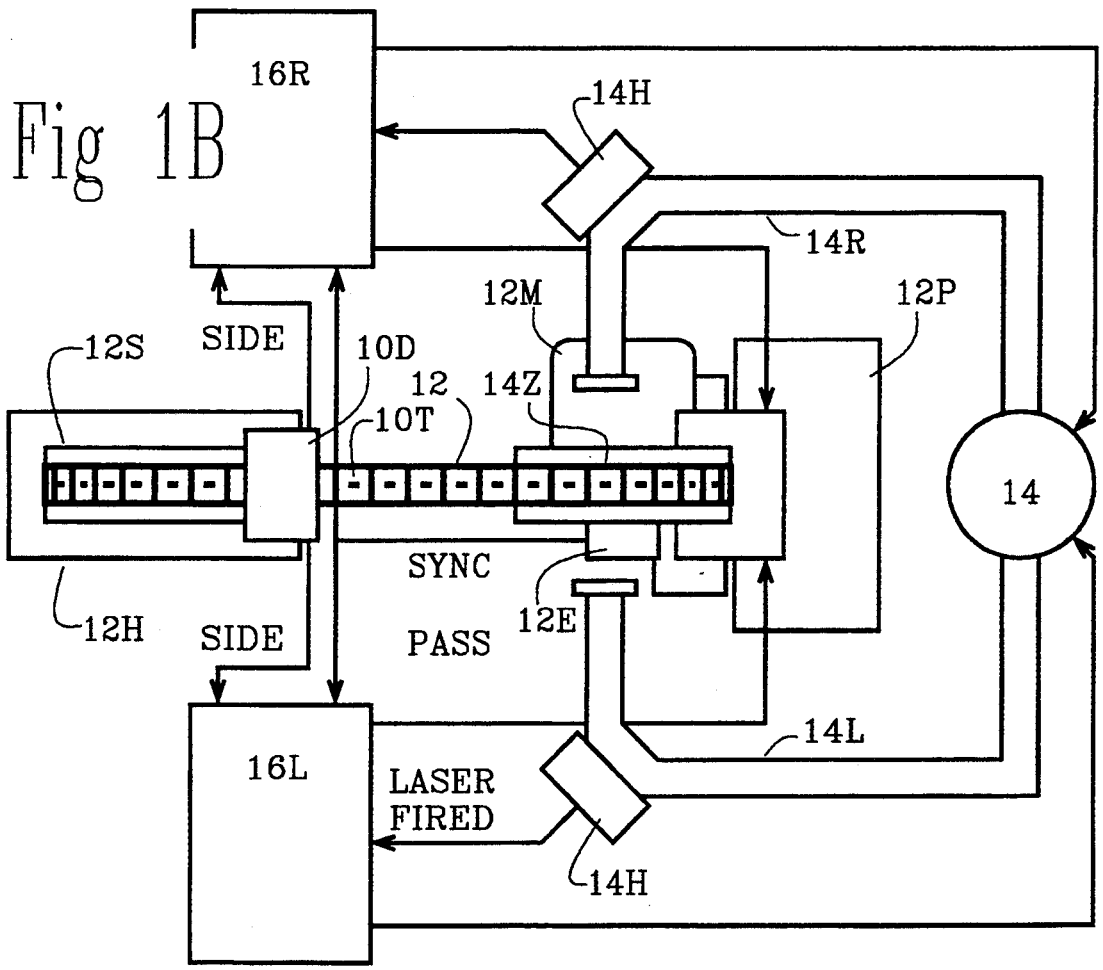
FIG. 1B is a top view of the tablet treating system of FIG. 1A.

MODES FOR CARRYING OUT THE INVENTION GENERAL EMBODIMENT—(FIG. 1A and 1B)

Tablet treating system 10 treats a series of pharmaceutical tablets 10T with pulses of laser energy within at least one predetermined treatment site on each tablet. A conveyer 12 continuously moves individual tablets along tablet path 10P from a supply end 10S to collection end 10C. Laser device 14 provides the pulses of laser energy along a stationary laser path which crosses the tablet path defining a stationary intersection zone 14Z common to both paths. The tablet path has periodic treatment windows 20W (see FIG. 2A) during which the treatment sites on the moving tablets pass through the stationary intersection zone. The operation of the laser device has periodic laser ready windows 24W during which the laser device may be fired. A controller device is responsive to the movement of the tablet conveyer and to the operation of the laser device for activating the laser beam and treating a tablet. The controller activates the laser beam when the tablet is passing through the intersection zone and the tablet treatment window coincides with the laser ready window. The controller does not activate the laser device and does not treat the tablet when the tablet treatment window does not coincide with the laser ready window. Abort mechanism 18 proximate the collection end of the tablet path is responsive to the controller for separating the treated tablets from the untreated tablets. The laser device may provide laser energy along multiple paths for complex treatment of the tablet. The embodiment of FIG. 1 shows a left laser path 14L and a right laser path 14R and corresponding controller 16L and 16R for treating the left and right sides of the tablet. Side detector 10D determines which side of each tablet is to be treated for example when treating non-symmetric tablets such as push-pull tablets (see FIG. 5B).

CONVEYER 12—(FIG. 1A and 1B)

A supply hopper 12H is positioned proximate the supply end of the tablet path for containing a reserve of untreated tablets which are loaded onto the conveyer for treatment with the pulses of laser energy. A pass collection hopper 12P and an reject collection hopper 12R are positioned proximate the abort mechanism at the collection end of the tablet path for collecting the treated (passed) tablets and the untreated (rejected) tablets.

An endless carrier chain 12 formed by carrier links (see FIG. 5A) extends from the supply hopper through the intersection zone to the collection end and back to the supply hopper for moving the tablets along the tablet path through the intersection zone for treatment. A supply support wheel 12S mounted within the supply hopper engages the supply end of the carrier chain, permitting the tablets to load onto the carrier chain. A collection support wheel 12C mounted proximate the collection end of the tablet path engages the collection end of the carrier chain. The collection wheel is positioned higher than the supply wheel to create a positive slope along the tablet path which raises the tablets out of the tablet supply hopper up to the intersection zone.

A suitable drive device such as motor 12M moves the endless carrier chain around the wheels and conveys the tablets along the tablet path. In the embodiment of FIG. 1, upper wheel 12C is a drive wheel connected to the drive motor and lower wheel 12S is a free turning idler wheel. The upper drive wheel pulls against the drag of the chain links and the idler wheel to hold the carrier chain taut along the inclined carrier path.

TIMING DIAGRAM—(FIG. 2A 2B and 2C)

A rotary encoder 12E responsive to the drive motor provides periodic sync home count 22H (see FIG. 2A) to the controller for synchronizing the position of the moving tablets on the carrier chain with the stationary intersection zone. In the embodiment of FIG. 2, each carrier link in the endless carrier chain carries one tablet to be treated, and the encoder provides a sync home count 22H defining the start of a sync period 22J as each carrier link approaches the intersection zone. The encoder also provides a predetermined number of smaller sync increment counts 22I between sequential sync home counts 22H defining the opening and closing of the treatment windows 20W within each sync period 22J. Initial lead period 20I is a defined number of sync increment counts (e.g. six sync increment counts as shown in FIG. 2A) defining the distance along the tablet path between each sync home count 22H and the start of the treatment window 20W corresponding to the leading edge of the treatment site on the moving tablet. The treatment window 20W is also a defined number of sync increment counts (e.g. ten sync increment counts 22I as shown in FIG. 2A).

FIG. 2A graphically depicts normal operation of the tablet treatment system. A continuous sequence of uniformly spaced treatment windows 20W is maintained by the uniform motion of the carrier chain. Each treatment window 20W opens on an increment count after the initial lead period 20I has expired, and closes on another increment count after the treatment window 20W has expired. A corresponding sequence of uniformly spaced laser ready windows 24W is maintained by controlling the operation of the laser device to match the speed of the carrier chain. Pulses or laser energy 24P are delivered by the laser device for drilling the release port in the tablet during the overlap between the treatment window 20W and the laser ready window 24W.

A suitable beam detection device such as a pyroelectric heat sensor 14H is positioned near each laser path. The heat sensor receives a small percentage of the laser energy transmitted through a reflecting mirror in the laser path. The heat is converted into electrical current which produces a LASER FIRED signal to the controller. The lack of a LASER FIRED signal indicates a laser malfunction and the controller aborts the tablet currently passing through the intersection zone.

In the embodiment of FIG. 2A, each tablet has one treatment site, and therefore each sync period 22J contains one treatment window 20W and one laser ready window 24W. The shorter ready window 24W is centered within the longer treatment window 20W providing leading and trailing drift regions 20L and 20T. The motion of the conveyer and the operation of the laser device may drift slightly from the sync, and the laser pulse 24P will still hit within the boundary of the treatment site as defined by the treatment window 20W. Normal increases and decreases in conveyer motion and laser operation are absorbed by the drift regions 20L and 20T. Initial calibration of the conveyer-laser sync may be established by mechanically adjusting the position of either the carrier chain or the timing of the laser device. In addition, the initial calibration of the treatment site on the tablet subsequent to sync home count may be effected by adjusting the number of increment counts 22I in the initial lead period 20I.

FIG. 2B depicts abnormal operation in which the motion of the conveyer and the operation of the laser have shifted out of sync, and the laser energy is no longer within the treatment site. The conveyer may temporarily bind or jam causing the carrier chain to slow down faster than the controller can adjust the operation of the laser device. Alternatively, the laser operation may accelerate, causing the treatment window 20W to lag in time and drift to the right relative to the advancing laser ready window 24W (as shown in the first window cycle of FIG. 2B). The laser pulse 24P gains on the treatment window 20W and arrives during the leading drift region 20L. As long as the overlap between the treatment window 20W and the laser ready window 24W is equal to or greater then the width of the laser pulse 24P (as shown in the second window cycle of FIG. 2B), the laser strikes within the treatment site.

A critical abort condition is reached when the window overlap approaches zero and is no longer sufficient to accommodate the laser pulse 24P (as shown in the third cycle of FIG. 2B). The controller can detect this condition through information about the pulse position via heat sensor 14H and information about the window position via rotary encoder 12E. The controller inhibits the PASS command to abort mechanism 18 which directs the current tablet into the reject collection hopper 12R.

Each tablet may have multiple treatment sites requiring multiple laser ready windows each with a laser pulse for drilling multiple release ports. The timing diagram shown in FIG. 2C shows a three pulse embodiment for providing three release ports in a single tablet. The laser must fire three times during each treatment window. Thus, three separate laser ready windows must overlap with a single treatment window.

ABORT MECHANISM (FIG. 3)

Figure 3:
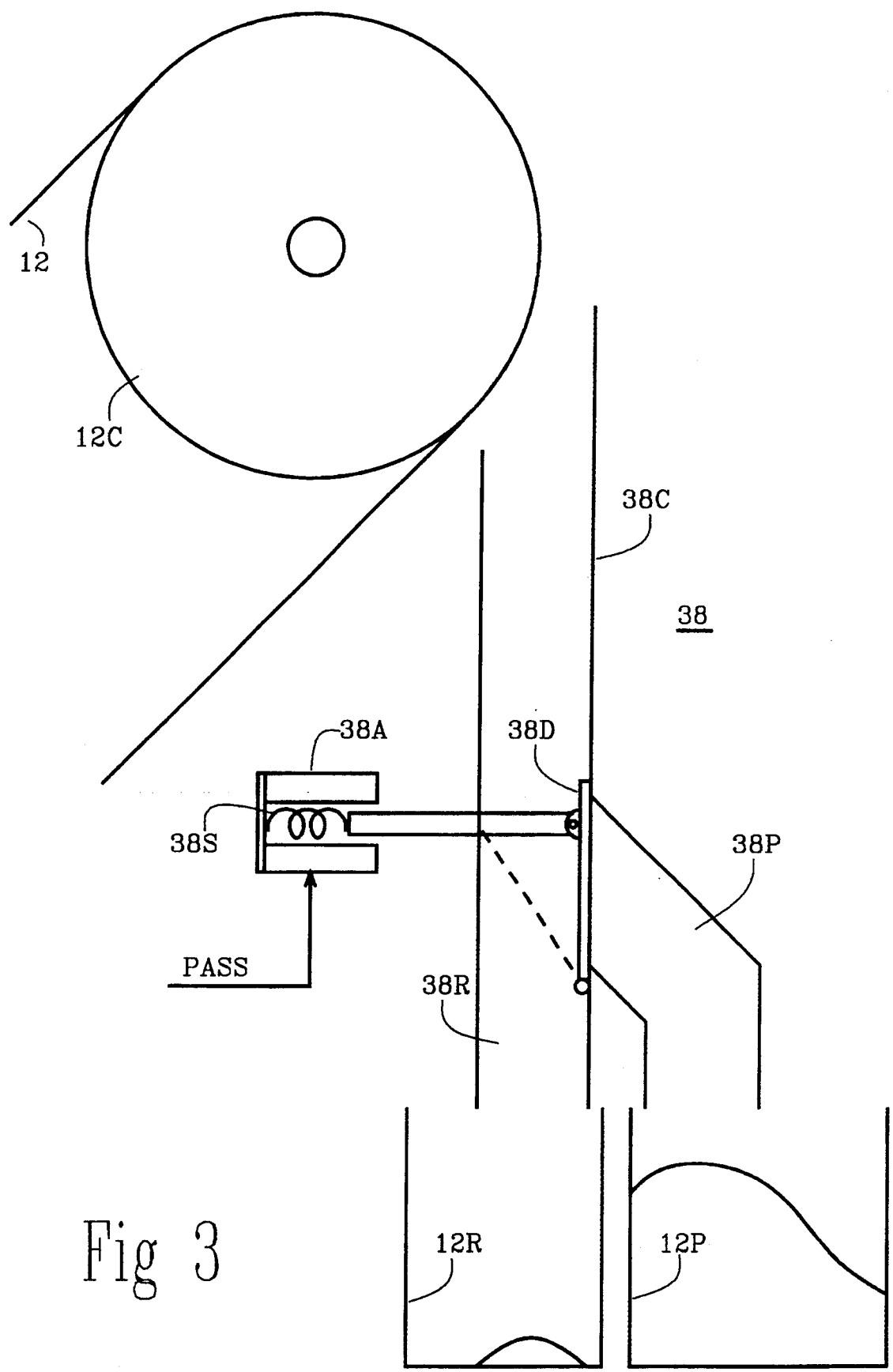
FIG. 3 is a side view of the abort mechanism which separates the treated tablets from the rejected tablets.

Abort mechanism 38 proximate the collection end of the conveyer 12 has a reject mode of operation for directing the rejected tablets into the reject collection hopper 12R, and a pass mode of operation for directing the treated tablets into the pass collection hopper 12P. A suitable actuator such as pneumatic, hydraulic, or electrical devices may be employed for changing the mode of operation of the abort mechanism in response to PASS commands from the controllers. The embodiment of FIG. 3 shows a linear electrical solenoid device 38A. The solenoid 38A has a non-actuated default condition which establishes the reject mode of operation, and an actuated condition which establishes the pass mode of operation. Spring return 38S retains the abort mechanism in the reject mode when non-actuated. The retaining force of the return spring must be overcome by actuating the abort solenoid 38A in order to advance the abort mechanism to the pass mode. The PASS commands may be slightly longer than the sync period 22J to prevent solenoid chatter as each tablet leaves the collection end of the conveyer 12.

Suitable collection channels are formed by common chute 38C which receives the tablets from the collection end of the conveyer, and reject chute 38R and pass chute 38P. The reject chute is generally downward directed and in communication with the reject collection hopper 12R. The pass chute 38P is also generally downward directed and in communication with the pass collection hopper 12P. The reject chute 38R has a side opening which defines the entrance into the pass chute 38P.

A suitable diverter device such as hinged plate 38D is responsive to the motion of solenoid 38A for directing the collected tablets into the reject collection hopper 12R or into the pass collection hopper 12P. During the reject mode of operation, the solenoid 38A is non-actuated and the diverter plate 38D blocks the entrance to the pass chute 38P (as shown in FIG. 3 by solid lines). During the pass mode of operation, the solenoid 38A is actuated causing the plate 38D to open the entrance into pass chute 38P and block the reject chute 38R (as shown in FIG. 3 by dashed lines). Positive action is required to operate the solenoid 38A, causing the abort mechanism to be biased toward the reject default mode. Miscellaneous problems such as controller glitches and power failure cause the tablets to be rejected.

Figure 4:
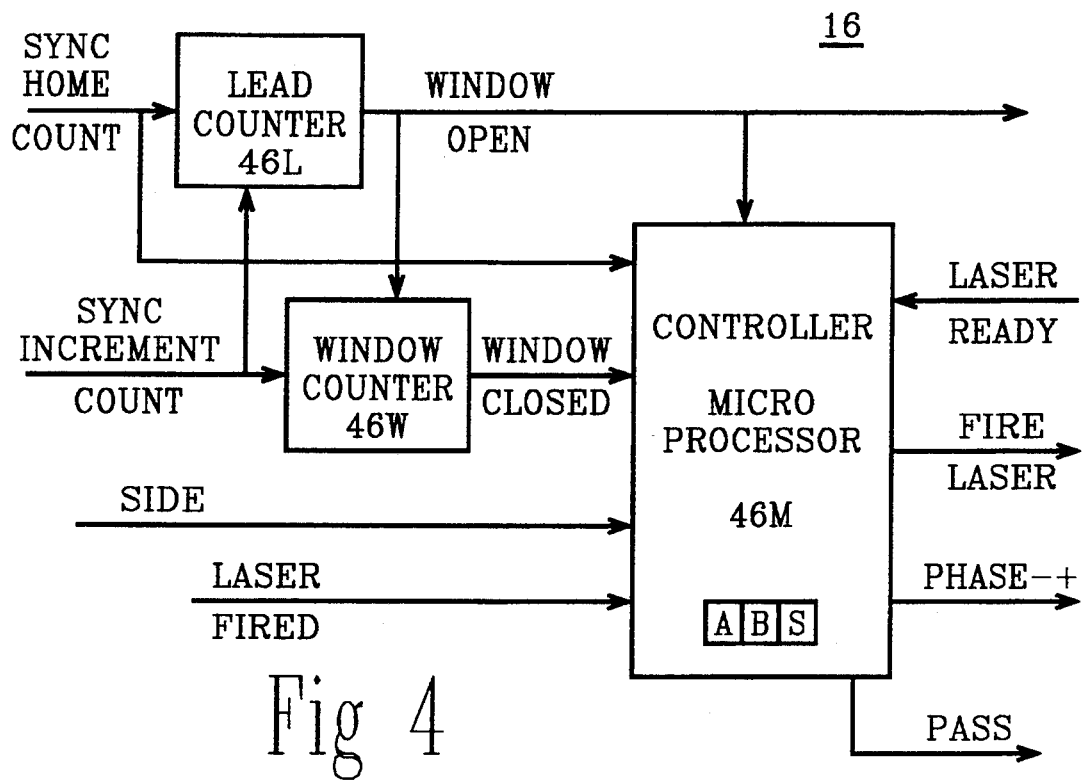
FIG. 4 is a block diagram of a controller for the treatment system.

In order to enhance the reliability of the abort mechanism 38, the tablets are aborted in lots, not just the current tablet associated with the abort condition. The abort lot includes "A" tablets in advance of the current tablet moving along the tablet path and "B" tablets behind the current tablet. During the reject mode of operation, the solenoid 38A is non-actuated for a period sufficient to reject the tablet currently at the intersection zone, and reject "A" tablets ahead of the tablet currently at the intersection zone, and reject "B" tablets behind the tablet currently at the intersection zone. If desired, the numerical value of "A" may equal the numerical value of "B". When an abort condition arises such as loss of sync, the system aborts "A" plus 1 plus "B" tablets. In addition, the abort mechanism may have an initial start mode of operation in which the first "S" tablets are rejected. Controller 46M (see FIG. 4) contains the values of "A", "B", and "S" in memory for inhibiting the PASS command.

CONTROLLER CIRCUIT (FIG. 4)

The controllers are suitable logic and computing devices such as microprocessor 46M for controlling the status of abort mechanism 38 and the operation of laser device 14. Lead counter 46L receives the SYNC HOME COUNTS and the SYNC INCREMENT COUNTS from encoder 12E for providing WINDOW OPEN timing signal to microprocessor 46M and to the laser device. The home counts reset the lead counter at the start of the sync period for each carrier link. The increment counts advance the lead counter to count off the initial lead period. The OPEN WINDOW signal occurs at the leading edge of tablet treatment window 20W and indicates that the lead period has expired and that the treatment window is open. Window counter 46W responds to the WINDOW OPEN signal to start the window count, and provides WINDOW CLOSED timing signal to the microprocessor. The WINDOW CLOSED signal occurs at the trailing edge of the tablet treatment window and indicates that the treatment window has expired.

The laser device responds to the WINDOW OPEN signal by providing a LASER READY status signal at the start of laser ready window 24W within the treatment window. The microprocessor then issues a FIRE LASER command to the laser device. The laser device fires, and heat sensors 14H detect the heat generated as the laser beam reflects off a corner mirror in the laser path. The heat sensors provide a LASER FIRED event signal to the microprocessor.

The microprocessor has carrier and tablet position information through the WINDOW OPEN and WINDOW CLOSED signals, and laser operation information through the LASER READY and LASER FIRED signals. The microprocessor calculates the adjustments in laser speed and phase and issues corresponding PHASE± commands to the laser device. The carrier speed is preferably constant at the maximum tablet rate, and the PHASE± commands account for speed variations within the system. The microprocessor also issues a PASS command to the abort mechanism if the laser fired within the tablet treatment window 20W. The microprocessor assumes that the laser will not fire and aborts the current tablet unless a LASER FIRED signal is received during the tablet treatment window.

Figure 5B:
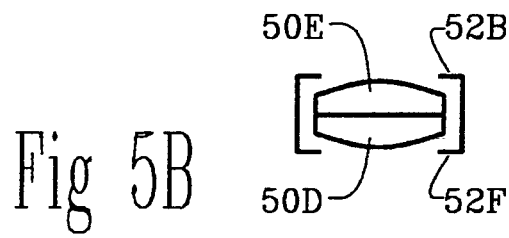
FIG. 5B is taken along lines 5B—5B of FIG. 5A showing the cradle flanges retaining a tablet.
Figure 5A:
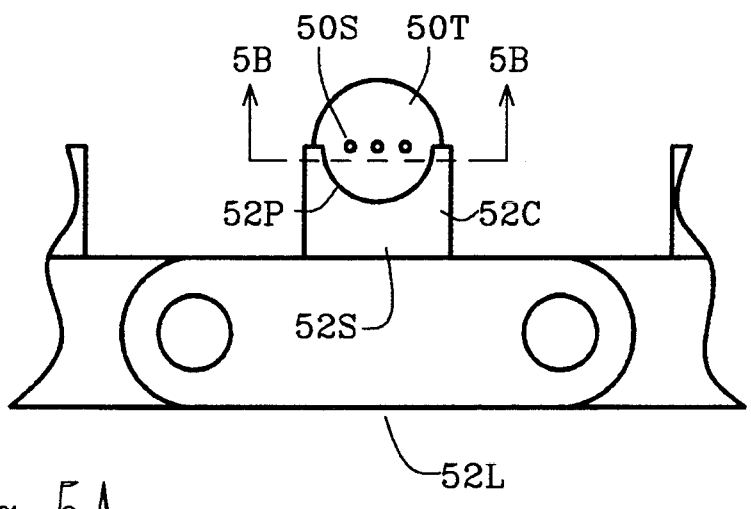
FIG. 5A a fragmentary side view of a link in the carrier chain showing a tablet cradle.

CRADLE ASSEMBLY 52C (FIGS. 5A and 5B)

Carrier chain 12 dips through the tablet reserve in supply hopper 12H and picks up one tablet per carrier link 52L in a suitable tablet retaining structure such as tablet cradle 52C (see FIG. 5A). The tablet 50T sits in shaped pocket 52P formed in the upper portion of the cradle. The front and back faces of the pocket are open to permit access to treatment sites 50S on the front and back sides of the tablet 50T seated therein. Front and back peripheral flanges 52F and 52B extend around the pocket opening for engaging the edge of the tablet 50T (see FIG. 5B) without blocking access to the treatment sites 50S in the center region of the tablet 50T. Support base 52S formed in the lower portion of the cradle 52C engages link 52L in the carrier chain 12.

Tablet 50T shown in FIG. 5A is a "push-pull" osmotic pump tablet described in U.S. Pat. No. 5,021,053. Tablet 50T is comprised of a bilayer core which is coated with an outer semipermeable membrane. The core has two layers: (i) an expandable push layer 50E which absorbs water and expands in situ; and (ii) a drug containing layer 50D. One or more release ports must be provided through the outer semipermeable membrane on the side of the tablet 50T which is adjacent to layer 50D. The drug in layer 50D is delivered through the release ports at sites 50S in response to the pressure exerted from the expanding layer 50E. These push-pull type tablets are one example of a class of non-symmetrical tablets having sides which must be treated differently. The release port must be on the drug side 50D. Side detector 10D determines which side of the tablet is the drug side 50D and directs the controllers 16L and 16R to drill on the drug side 50D and not on the expandable push side 50E. The sides are distinguishable, typically based on color. Side detector 10D provides a SIDE status signal to controller 46M (see FIG. 4) indicating the orientation of the tablet 50T.

INDUSTRIAL APPLICABILITY

The following particulars of tablet treatment system 10 are given as an illustrative example of the synchronization between the treatment window and the laser ready window. In this example:

| | |
|---|---|
| chain 12 speed | 20 tablets per second |
| chain 12 slope | 45 degrees |
| chain link 52L | 1 inches (2.56 cm) |
| sync period 22J | 50 milli seconds |
| home count 22H | one per sync period |
| increment count 22I | 400 per home count |
| lead period 20I | 160 counts |
| treatment window 20W | 80 counts |
| lead drift region 20L | 32 counts |
| laser ready window 24W | 16 counts |
| laser pulse 24P | 25 micro seconds |
| abort lot size | A = B = 3, S = 20 |

The values and dimensions given above are not intended as defining the limitations of the invention. Numerous other applications and configurations are possible.

It will be apparent to those skilled in the art that various changes may be made in the structure and embodiments shown herein without departing from the concept of the invention. Further, features of the embodiments shown in the various Figures may be employed with the embodiments of the other Figures.

Therefore, the scope of the invention is to be determined by the terminology of the following claims and the legal equivalents thereof.

We claim:

1. A tablet treating system for treating pharmaceutical tablets with pulses of laser energy within at least one predetermined treatment site on each tablet, comprising:

conveying means for moving a series of individual tablets along a tablet path having a supply end for receiving untreated tablets and having a collection end;

laser means for providing the pulses of laser energy along a stationary laser path which crosses the tablet path defining a stationary intersection zone common to both paths;

periodic treatment windows in the tablet path during which the treatment sites on the moving tablets pass through the intersection zone;

laser ready windows in the operation of the laser means during which the laser means may be fired; and controller means responsive to a parameter selected from the group consisting of (i) the movement of the tablets, (ii) the position of the tablets, (iii) the position of the tablet conveying means, and (iv) the movement of the tablet conveying means, the controller means also being responsive to the operation of the laser means for activating the laser means and treating a tablet when the tablet is passing through the intersection zone and the tablet treatment window coincides with a sufficient potion of the laser ready window to accomodate the laser pulse.

2. The tablet treating system of claim 1, wherein the laser means provides the pulses of laser energy along one laser path striking one side of the tablet for treating that one side.

3. The tablet treating system of claim 1, wherein the tablet has a first side and a second side, and the laser means provides pulses of laser energy along either of two laser paths, including a first laser path striking the first side of the tablet for treating the first side as a treatment site on the first side passes through the intersection zone, and a second laser path striking the second side of the tablet for treating the second side as a treatment site on the second side passes through the intersection zone.

4. The tablet treating system of claim 3, wherein the laser means treats both the first side and the second side of the tablet as the treatment sites thereon pass through the intersection zone.

5. The tablet treating system of claim 3, wherein the laser means treats only one side of the first and second sides of the tablet as the treatment sites on the only one side pass through the intersection zone.

6. The tablet treating system of claim 1, further comprising:

tablet supply means proximate the supply end of the tablet path for containing a reserve of tablets which are loaded onto the conveying means for treatment with the pulses of laser energy;

pass collection means positioned proximate the abort means at the collection end of the tablet path for collecting the treated tablets; and reject collection means positioned proximate the abort means at the collection end of the tablet path for collecting the rejected tablets.

7. The tablet treating system of claim 6, wherein the conveying means further comprises:

endless carrier means extending from the tablet supply means through the intersection zone to the collection end and back to the tablet supply means for moving the tablets along the tablet path through the intersection zone for treatment;

a supply wheel mounted proximate the tablet supply means for engaging the supply end of the endless carrier means; and a collection wheel mounted proximate the collection end of the tablet path for engaging the collection end of the endless carrier means.

8. The tablet treating system of claim 7, wherein the supply wheel is positioned in the tablet supply means for permitting the tablets to load onto the endless carrier means, and the collection wheel is positioned higher than the supply wheel to create a positive slope in the tablet path between the supply wheel and the collection wheel which raises the tablets out of the tablet supply means.

9. The tablet treating system of claim 7, wherein the conveying means further comprises:

drive means for driving the endless carrier means around the supply wheel and the collection wheel for moving the tablets along the tablet path.

10. The tablet treating system of claim 9, wherein the collection wheel is a drive wheel and is turned by the drive means to move the endless carrier means, and the supply wheel is an idler wheel.

11. The tablet treating system of claim 9, wherein the conveying means further comprises:

a rotary encoder means responsive to the drive means for providing periodic sync counts to the controller means for synchronizing the position of the moving tablets on the carrier means relative to the stationary intersection zone.

12. The tablet treating system of claim 11, wherein the endless carrier means is a carrier chain formed by carrier links.

13. The tablet treating system of claim 12, wherein the encoder means provides a sync home count defining a sync period as each carrier link in the endless carrier chain approaches the intersection zone.

14. The tablet treating system of claim 13, wherein the each carrier link in the endless carrier chain carries one tablet to be treated.

15. The tablet treating system of claim 13, wherein the encoder means provides a predetermined number of sync increment counts between sequential sync home counts.

16. The tablet treating system of claim 15, wherein the controller means further comprises:

lead counter means responsive to the sync increment counts from the encoder for defining the distance along the tablet path between the sync home count and the start of the treatment window corresponding to the leading edge of the treatment site on the moving tablet.

17. The tablet treating system of claim 16, wherein the controller means further comprises:

window counter means responsive to the lead counter means and to the sync increment counts for defining the distance along the tablet path between the start of the treatment window and the end of the treatment window corresponding to the trailing edge of the treatment site on the moving tablet.

18. The tablet treating system of claim 6, wherein the abort means further comprises:

a reject mode of operation for directing the rejected tablets into the reject collection means;

a pass mode of operation for directing the treated tablets into the pass collection means; and actuator means for changing the mode of the operation of the abort means.

19. The tablet treating system of claim 18, wherein the actuator means has a default non-actuated condition which establishes the reject mode of operation, and an actuated condition which establishes the pass mode of operation.

20. The tablet treating system of claim 19, wherein the actuator means is a spring return solenoid which maintains the abort means in the reject mode when non-actuated, and which advances the abort means to the pass mode when actuated.

21. The tablet treating system of claim 18, wherein the abort means further comprises:

collection channel means for receiving the tablets from the collection end of the conveying means; and diverter means responsive to the actuator means for directing the collected tablets into the reject collection means and the pass collection means.

22. The tablet treating system of claim 21, wherein the collection channel further comprises:

a generally downward directed reject chute in communication with the reject collection means;

a generally downward directed pass chute in communication with the pass collection means;

the reject chute having an entrance leading to the pass chute; and the diverter means blocks the entrance to the pass chute during the reject mode of operation, and opens the entrance to the pass chute and blocks the reject chute during the pass mode of operation.

23. The tablet treating system of claim 18, wherein during the reject mode of operation, the abort means rejects the tablet currently at the intersection zone, and rejects "A" tablets ahead of the rejected tablet currently at the intersection zone, and rejects "B" tablets behind the rejected tablet currently at the intersection zone.

24. The tablet treating system of claim 23, wherein "A" equals "B".

25. The tablet treating system of claim 18, wherein abort means has an initial start mode of operation in which the first "S" tablets are rejected.

26. The system of claim 1, including an abort means responsive to the controller means for separating the treated tablets from the untreated tablets.

27. The system of claim 26, wherein the abort means is proximate a collection end of the tablet path.

28. The system of claim 1, wherein the conveying means continuously moves the tablets along the tablet path.

29. The system of claim 1, wherein the laser ready windows are periodic.

30. The system of claim 1, wherein the controller means does not activate the laser means and rejects the tablet when the tablet treatment window does not coincide with a sufficient portion of the laser ready window to accomodate the laser pulse.

31. A controller for a tablet treating system for treating pharmaceutical tablets with pulses of laser energy within at least one predetermined treatment site on each tablet, the tablet treating system including means for conveying a series of individual tablets along a tablet path, laser means for providing the pulses of laser energy along a stationary laser path which crosses the tablet path defining a stationary intersection zone common to both paths, periodic treatment windows in the tablet path during which the treatment sites on the moving tablets pass through the stationary intersection zone, and laser ready windows in the operation of the laser means during which the laser means may be fired, the controller comprising:

controller means responsive to a parameter selected from the group consisting of (i) the movement of the tablets, (ii) the position of the tablets, (iii) the position of the tablet conveying means, and (iv) the movement of the tablet conveying means, the controller means also being responsive to the operation of the laser means for activating the laser means and treating a tablet when the tablet is passing through the intersection zone and the tablet treatment window coincides with a sufficient portion of the laser ready window to accomodate the laser pulse.

32. The controller of claim 31, wherein the controller means does not activate the laser means and rejects the tablet when the tablet treatment window does not coincide with a sufficient portion of the laser ready window to accomodate the laser pulse.

33. The controller of claim 32, wherein the tablet treating system further includes abort means proximate the tablet path, the abort means being responsive to the controller means for separating the treated tablets from the rejected tablets.

34. The controller of claim 33, the abort means further including a reject mode of operation for directing rejected tablets into a reject collection means, a pass mode of operation for directing treated tablets into a pass collection means, wherein during the reject mode of operation, the abort means rejects the tablet currently at the intersection zone, and rejects "A" tablets ahead of the rejected tablet currently at the intersection zone, and rejects "B" tablets behind the rejected tablet currently at the intersection zone.

35. The controller of claim 34, wherein "A" equals "B".

36. The controller of claim 33, the abort means further including a reject mode of operation for directing rejected tablets into a reject collection means, a pass mode of operation for directing treated tablets into a pass collection means, wherein the abort means has an initial start mode of operation in which the first "S" tablets are rejected.

37. The controller of claim 31, wherein the conveying means further includes drive means for driving an endless carrier chain formed by carrier links, a rotary encoder means responsive to the drive means for providing (i) periodic sync counts to the controller means for synchronizing the position of the moving tablets on the carrier means relative to the stationary intersection zone, (ii) a sync home count defining a sync period as each carrier link in the endless carrier chain approaches the intersection zone, and (iii) a predetermined number of sync increment counts between sequential sync home counts, and wherein the controller means further comprises;

lead counter means responsive to the sync increment counts from the encoder for defining the distance along the tablet path between the sync home count and the start of the treatment window corresponding to the leading edge of the treatment site on the moving tablet.

38. The controller of claim 37, wherein the controller means further comprises:

window counter means responsive to the lead counter means and to the sync increment counts for defining the distance along the tablet path between the start of the treatment window and the end of the treatment window corresponding to the trailing edge of the treatment site on the moving tablet.

39. A method for treating pharmaceutical tablets with pulses of laser energy within at least one predetermined treatment site on each tablet, comprising:

conveying a series of individual tablets along a tablet path;

providing a stationary laser path which crosses the tablet path defining a stationary intersection zone common to both paths;

providing periodic treatment windows in the tablet path during which the treatment sites on the moving tablets pass through the stationary intersection zone;

providing laser ready windows in the operation of the laser means during which the laser means may be fired;

controlling the operation of the laser means by activating the laser means and treating a tablet when the tablet is passing through the intersection zone and the tablet treatment window coincides with a sufficient portion of the laser ready window to accomodate the laser pulse.

40. The method of claim 39, including not activating the laser means and rejecting the tablet when the tablet treatment window does not coincide with a sufficient portion of the laser ready window to accomodate the laser pulse.

41. The method of claim 39, including separating the treated tablets from the rejected tablets.

42. The method of claim 39, wherein each of the tablets has a first side and a second side, the method further including providing pulses of laser energy along either of two laser paths, including a first laser path directed to the first side of each of the tablets passing through the intersection zone and a second laser path directed to the second side of each of the tablets passing through the intersection zone.

43. The method of claim 42, including treating only one side of the first and second sides of each tablet passing through the intersection zone.

44. The method of claim 39, including directing rejected tablets into a reject collection means during a reject mode of operation and directing treated tablets into a pass collection means during a pass mode of operation.

45. The method of claim 44, including rejecting the tablet currently at the intersection zone, rejecting "A" tablets ahead of the rejected tablet currently at the intersection zone, and rejecting "B" tablets behind the rejected tablet currently at the intersection zone, during the reject mode of operation.

46. The method of claim 45, wherein "A" equals "B".

47. The method of claim 44, including rejecting the first "S" tablets during an initial start mode of operation.

48. The method of claim 39, including providing periodic sync counts for synchronizing the position of the moving tablets on the carrier means relative to the stationary intersection zone.

49. The method of claim 39, wherein the tablets are conveyed by an endless carrier chain formed by carrier links, and further including providing a sync home count defining a sync period as each carrier link in the endless carrier chain approaches the intersection zone.

50. The method of claim 49, including providing a predetermined number of sync increment counts between sequential sync home counts.

* * * * *